United States Patent
Keoshkerian et al.

(10) Patent No.: US 9,567,470 B1
(45) Date of Patent: Feb. 14, 2017

(54) CARBON BLACK POLYMERIC FILLER USEFUL FOR PRINTING APPLICATIONS

(71) Applicant: XEROX CORPORATION, Norwalk, CT (US)

(72) Inventors: Barkev Keoshkerian, Thornhill (CA); Carolyn Moorlag, Mississauga (CA)

(73) Assignee: Xerox Corporation, Norwalk, CT (US)

( * ) Notice: Subject to any disclaimer, the term of this patent is extended or adjusted under 35 U.S.C. 154(b) by 0 days.

(21) Appl. No.: 14/922,125

(22) Filed: Oct. 24, 2015

(51) Int. Cl.
| | |
|---|---|
| *F21V 9/04* | (2006.01) |
| *F21V 9/06* | (2006.01) |
| *G02B 5/22* | (2006.01) |
| *G02B 5/26* | (2006.01) |
| *C09D 5/32* | (2006.01) |
| *C09D 11/037* | (2014.01) |
| *C09D 153/00* | (2006.01) |
| *B41C 1/10* | (2006.01) |

(52) U.S. Cl.
CPC ............... *C09D 5/32* (2013.01); *C09D 11/037* (2013.01); *C09D 153/00* (2013.01)

(58) Field of Classification Search
CPC ........ C09D 5/32; C09D 11/037; C09D 153/00
USPC .................................. 101/453, 467; 252/587
See application file for complete search history.

(56) References Cited

U.S. PATENT DOCUMENTS

| | | | | |
|---|---|---|---|---|
| 5,952,429 A * | 9/1999 | Ikeda | ..................... | B41M 5/385 |
| | | | | 428/402.24 |
| 2016/0122549 A1* | 5/2016 | Keoshkerian | ............. | C09C 1/56 |
| | | | | 524/546 |

OTHER PUBLICATIONS

Shinji Hayashi, Atsushi Naitoh, Seiichi Machida,1 Masaki Okazaki, Kiyotaka Maruyama and Norio Tsubokawa, Grafting of Polymers onto a Carbon Black Surface by the Trapping of Polymer Radicals, Appl. Organometal. Chem. 12, 743-748 (1998), Applied Organometallic Chemistry.*

(Continued)

*Primary Examiner* — Bijan Ahvazi
(74) *Attorney, Agent, or Firm* — Ronald E. Prass, Jr.; Prass LLP

(57) ABSTRACT

This disclosure is directed to functionalized carbon black material that may be particularly usable for as a filler material to a number of beneficial uses, particularly in image forming devices. The disclosed functionalized carbon black material compositions include hydrophobic carbon black particles surface passivated via the use of an NB-block copolymer where the NB block contains a pentafluorostyrene-maleimide alternating polymer and the B block contains pure pentafluorostyrene. The A/B portion allows for the polymer to adsorb onto the carbon black while the b-block acts as the stabilizer in fluorinated systems. Fine dispersions result from the addition of poly (pentafluorostyrene/Maleimide-b-pentafluorostyrene) or P(PFS/MI-b-PFS) passivated carbon black to fluorinated polymers, enhancing the physical and mechanical properties. The disclosed surface passivated carbon black particles are particularly usable for improving operational characteristics of fluorosilocone-based reimageable surface layers of imaging members employed in variable data digital lithographic image forming devices.

17 Claims, 2 Drawing Sheets

(56) References Cited

OTHER PUBLICATIONS

Victoria B. Rodriguez, Scott M. Henry, Allan S. Hoffman, Patrick S. Stayton. Xingde Li, Suzie H. Pun, Encapsulation and stabilization of indocyanine green within poly,,styrene-alt-maleic anhydride . . . blockpoly,, styrene . . . micelles for near-infrared imaging, Journal of Biomedical Optics 13(1), 0140251-01402510, Jan./Feb. 2008.*

Benoit Lessard and Milan Maric, One-Step Poly(styrene-alt-maleic anhydride)-block-poly(styrene) Copolymers with Highly Alternating Styrene/Maleic Anhydride Sequences are Possible by Nitroxide-Mediated Polymerization. Macromolecules 2010, 43, 879-885.*

* cited by examiner

CARBON BLACK POLYMERIC FILLER USEFUL FOR PRINTING APPLICATIONS

This application is related to U.S. patent application Ser. No. 14/922,124, filed Oct. 24, 2015, which issued as U.S. Pat. No. 9,469,143 on Oct. 18, 2016, entitled "DIGITAL LITHOGRAPHIC IMAGE FORMING SURFACE INCORPORATING A CARBON BLACK POLYMERIC FILLER," filed in the U.S. Patent and Trademark Office on a same day as this application, and co-owned with this application, the disclosure of which is hereby incorporated by reference herein in its entirety.

FIELD OF DISCLOSURE

This disclosure is related to carbon black-containing filler material. In particular, the disclosure relates to modified carbon black filler material suitable for use in various marking and printing methods and systems, such as variable data digital lithographic printing, among others.

BACKGROUND

Lithography and offset lithography are common methods of printing today. The terms "printing," "marking" and "image forming" are used interchangeably in this disclosure. In a typical lithographic printing process an image transfer surface, which may be a flat plate, a surface of a cylinder or drum, a surface of a belt or the like is formed to have "image regions" formed of a hydrophobic/oleophilic material, and "non-image regions" formed of a hydrophilic/oleophobic material. The image regions correspond to the areas on the final print (i.e., the target image receiving media substrate) that are occupied by a printing or marking material such as ink to form images on the substrate. The non-image regions correspond to the areas on the final print that are not occupied by the printing or marking material. The hydrophilic regions accept and are readily wetted by surface preparation fluids, which may include water-based fluids or other compound fluids, that may be commonly referred to as dampening fluids or fountain solutions. These fluids conventionally consist of water and small amounts of alcohol and/or other additives and/or surfactants that are included to reduce surface tension of the fluids.

The hydrophobic regions repel dampening fluid and accept ink, whereas the dampening fluid formed over the hydrophilic regions forms a fluid "release layer" for rejecting ink. The hydrophilic regions of the printing plate thus correspond to unprinted areas, or "non-image areas", of the final print.

As indicated above, in varying conventional systems, the ink may be transferred directly to a target image receiving media substrate, such as paper, or may alternatively be applied to an intermediate image transfer surface, such as an offset (or blanket) cylinder in an offset printing system. Offset cylinders are often covered with conformable coatings or sleeves with surfaces that can conform to the texture of the target image receiving media substrate, which may have, for example, a surface peak-to-valley depth somewhat greater than the surface peak-to-valley depth of the imaging plate. Also, surface roughness of the offset (or blanket) cylinder helps to deliver a more uniform layer of the printing materials, including inks, to the target image receiving media substrates free of defects such as mottle. Sufficient pressure is used to transfer the image from the offset (or blanket) cylinder to the target image receiving media substrate. This pressure transfer often occurs at a transfer nip through which the target image receiving media substrate is pinched between the offset (or blanket) cylinder and an opposing pressure member, such as an impression cylinder, that provides the pressure on the non-image side of the target image receiving media substrate.

Typical lithographic and offset printing techniques use plates that are permanently patterned, and are therefore useful only when printing a large number of copies of the same image (i.e., for long print runs), such as magazines, newspapers, and the like. These techniques are not generally considered useful in creating and printing documents in which new patterns are generated from one page to the next without removing and replacing the print cylinder and/or the imaging plate. In this regard, lithographic techniques cannot accommodate true high speed variable data printing in which the images change from impression to impression, for example, as in the case of digital printing systems. Furthermore, the cost of the permanently patterned imaging plates or cylinders is amortized over the number of copies. The cost per printed copy is therefore higher for shorter print runs of the same image than for longer print runs of the same image, as opposed to prints from digital printing systems.

SUMMARY OF THE DISCLOSED EMBODIMENTS

Based on the above shortfalls, a lithographic technique, referred to as variable data digital lithography, has been developed which uses a non-patterned reimageable surface on an imaging member. The process of image forming on the non-patterned reimageable surface commences with substantially uniformly coating the reimageable surface of the imaging member with a dampening fluid layer. Regions of the dampening fluid are removed by exposure to a focused radiation source, such as, for example, a laser light source, to form pockets. A temporary pattern in the dampening fluid is thus formed over the non-patterned reimageable surface. Ink applied to the patterned reimageable surface is retained in the pockets formed by the removing of the dampening fluid. The inked surface is then brought into contact with an image receiving media substrate, or an intermediate transfer surface at a transfer nip. The ink transfers from the pockets in the dampening fluid layer to the image receiving media substrate, or to the intermediate transfer surface for further transfer to an image receiving media substrate. Targeted transfer efficiencies for ink transfer from the reimageable surface are in a range of 95% or greater. In this process, residual ink and the dampening fluid may then be removed from the reimageable surface, a new uniform layer of dampening fluid may then applied to the reimageable surface, and the patterning, inking and transfer steps of the process repeated.

Reimageable surfaces of the imaging members are formed of materials that have been experimentally determined to advantageously support the steps of the ink-based digital printing process. Such reimageable surface layers may be formed of, for example, a fluorosilicone and an infrared-absorbing filler. The fluorosilicone may include amino-functional groups. The filler may be selected from the group consisting of carbon black, iron oxide, carbon nanotubes, graphene, graphite, and carbon fibers.

Alternative filler materials, or improvements to certain of the currently employed filler materials, that may present filler materials that are more suitable for use in the reimageable of imaging members in variable data digital lithography are desired.

Carbon black is used as a filler material in a variety of polymeric materials and for different applications. Carbon black is commonly added to impart thermal and/or electrical conductivity. Carbon black is also used as a light absorbing particle.

If a polymer matrix is hydrophobic, and especially if it is fluorinated, as are certain of the materials from which the reimageable surfaces of the imaging members for the above-discussed variable data digital lithographic image forming processes are formed, compatibility of carbon black in the polymer matrix is an issue. Problems with carbon black compatibility tend to manifest themselves detrimentally in the form of particle agglomeration and particle shedding from the matrix. Incompatibility may lead to poor mechanical properties and/or requirements of high loading to obtain desired thermal, electrical and/or optical properties. Particles may be ground using various milling techniques to a fine particle size. Incompatibility with the matrix, however, may generally result in re-agglomeration re-introducing the difficulties listed above.

Exemplary embodiments according to this disclosure may provide passivated carbon black particles suitable for use as polymeric fillers. In particular embodiments, poly-(pentafluorostyrene/Maleimide-b-pentafluorostyrene) passivated carbon black particles suitable as polymeric filler are provided.

In embodiments, surface passivation of carbon black particles is provided via the use of an A/B-block copolymer where the A/B block contains a pentafluorostyrene-maleimide alternating polymer and the B block contains pure pentafluorostyrene.

In embodiments, the A/B portion allows for the polymer to adsorb onto the carbon black filler particles while the b-block acts as a stabilizer in fluorinated systems. Fine dispersions result from the addition of poly (pentafluorostyrene/Maleimide-b-pentafluorostyrene) or P(PFS/MI-b-PFS) passivated carbon black to fluorinated polymers, enhancing the physical and mechanical properties.

In embodiments, the disclosed passivating schemes allow for the passivation via an absorption process that does not require heating to above 120° C. and may allow for the use of lower boiling fluorinated media.

Exemplary embodiments may provide particulate filler comprising at least one of functionalized carbon black particles, carbon nanotubes, graphite particles and carbon fibers.

The disclosed surface passivated carbon black particles may find particular utility in incorporation into reimageable surfaces of the imaging members employed for the above-described variable data digital image forming operations. The surface passivated carbon black particles provided by this disclosure may be useful for other applications in addition to offset printing, such as fillers for fusing members or for solid ink printing transfer drums.

Exemplary embodiments are described herein. It is envisioned, however, that any composition, apparatus, method, or system that incorporates features of this disclosure is encompassed by the scope and spirit of the exemplary embodiments.

DETAILED DESCRIPTION

Figure 1:
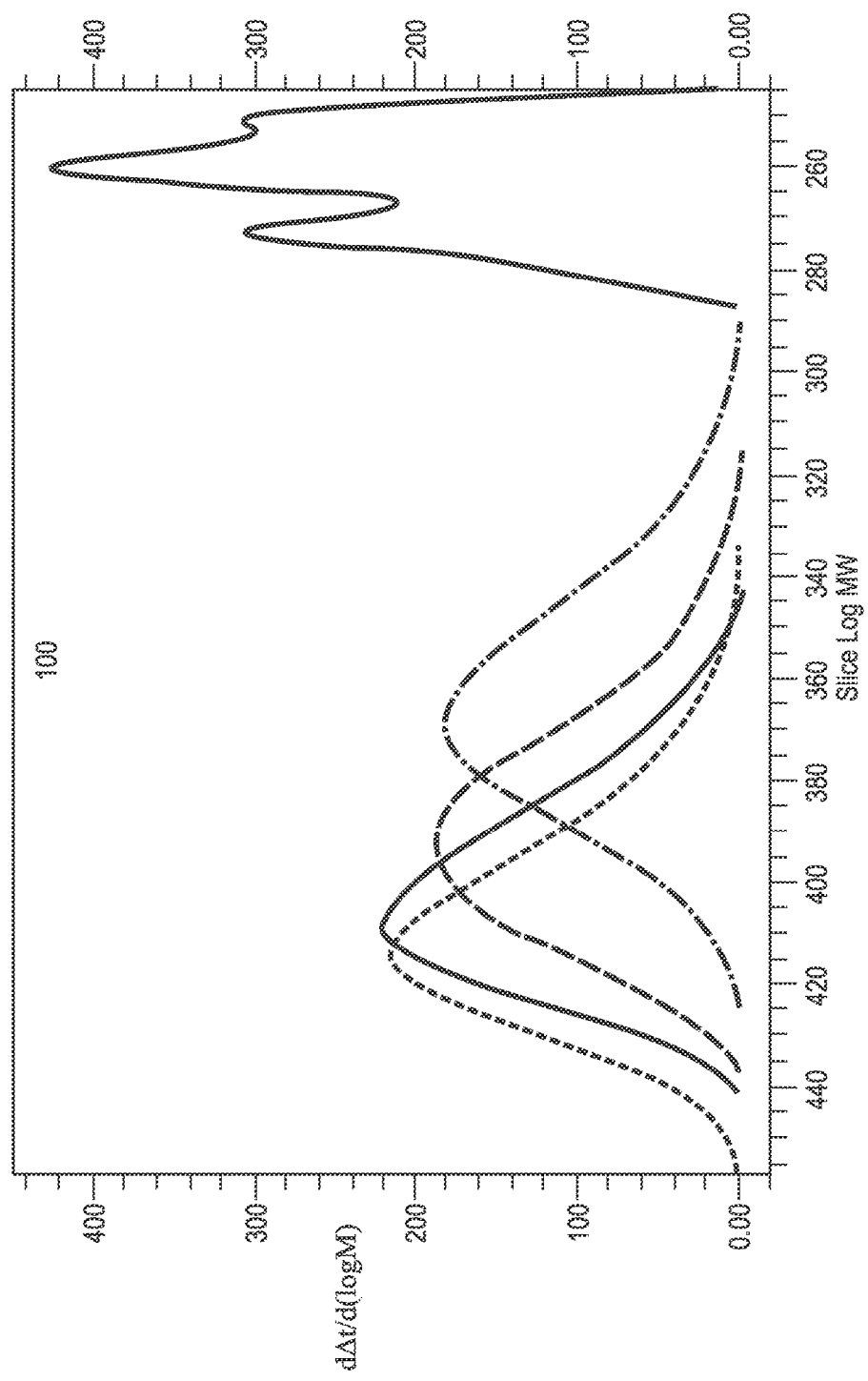
FIG. 1 illustrates a graph showing an incremental increase of mass average molecular mass (Mw) for the polymers prepared according to this disclosure.

Exemplary embodiments are intended to cover all alternatives, modifications, and equivalents as may be included within the spirit and scope of the compositions, methods, and systems as described below.

The modifiers "about" and/or "substantially" used in connection with any quantity or feature are intended to be inclusive of any stated values and as having a meaning dictated by the context (for example, these modifiers are used to include at least the degree of error associated with any measurement or feature that may be considered reasonable and the particular context). When used with a specific value, the use of the modifier "about" should also be considered as disclosing that specific value.

Reference is made to the drawings to accommodate understanding of filler compositions, methods, and systems in accordance with embodiments, particularly functionalized carbon black for use with variable data digital lithography printing system components such as imaging member filler. "Variable data lithography printing," or "ink-based digital printing," or "digital offset printing" are terms that are used essentially interchangeably throughout this disclosure to connote lithographic printing of variable image data for producing images on individual image receiving media substrates in which the images are changeable with each subsequent rendering of the images on sequential substrates in the image forming process. "Variable data digital lithographic printing" includes offset printing of ink images using lithographic ink in which the images are based on digital image data that may vary from image to image. Ink-based digital printing uses a variable data lithography printing system, or digital offset printing system. A "variable data digital lithography system" is a system that is configured for lithographic printing using lithographic inks and based on digital image data, which may be variable from one image to the next.

An imaging member surface, and particularly a reimageable surface of an imaging member as discussed above, generally has a tailored topology, a micro-roughened surface structured to retain a uniform layer of dampening fluid in non-image areas following imaging via an imaging device, as described above. Hillocks and pits that constitute the micro-roughened surface enhance the static or dynamic surface energy forces that may attract the dampening fluid to the reimageable surface. This reduces the tendency of the dampening fluid to be forced away from the reimageable surface by roller nip action, for example.

The imaging member plays multiple roles in the variable data digital lithography printing process. These roles may include: (1) wetting with a uniform layer of dampening fluid, (2) creation of a latent image through image wise patterning of the uniform layer of dampening fluid, (3) inking with an offset ink, and (4) enabling the ink to lift off and be transferred to an image receiving media substrate, while retaining surface adhesion of the patterned layer of dampening fluid.

Some desirable qualities for the reimageable surface of the imaging member, include high tensile strength to increase the useful service lifetime of the imaging member. The surface layer should also weakly adhere to the ink, yet be wettable with the ink, to promote both uniform inking of image areas and to promote subsequent transfer of the ink from the surface to the image receiving media substrate. Finally, some solvents have such an affinity for the imaging member that they inevitably cause some swelling of the reimageable surface of the imaging member. Wear can proceed indirectly under these swell conditions by causing the release of near infrared laser energy-absorbing particles at the imaging member surface, which then act as abrasive particles. Desirably, the imaging member surface layer has a low tendency to be penetrated by solvent and a high tendency for retention of energy absorbing particles.

An imaging member that meets these requirements may include a surface having fluorosilicone and an infrared-absorbing filler. The term "fluorosilicone" as used in this disclosure refers generally to polyorganosiloxanes having a backbone formed from silicon and oxygen atoms and sidechains containing carbon, hydrogen, and fluorine atoms. At least one fluorine atom is present in the sidechain. The sidechains can be linear, branched, cyclic, or aromatic. The fluorosilicone may also contain functional groups, such as amino groups, which permit additional crosslinking. When the crosslinking is complete, such groups become part of the backbone of the overall fluorosilicone. Fluorosilicones are commercially available, as, for example, CF1-3510 from NuSil.

The infrared-absorbing filler may absorb energy from the infra-red portion of the electromagnetic spectrum (having a wavelength of from about 750 nm to about 1000 nm). This aids in efficient interaction of the energy radiated from the image wise patterning device (i.e., a laser) and the dampening fluid. The infrared-absorbing filler may be carbon black, a metal oxide such as iron oxide (FeO), carbon nanotubes, graphene, graphite, or carbon fibers.

A filler particle in accordance with embodiments of this disclosure includes surface passivated carbon black particles. It is important that filler particles do not negatively impact surface interactions when used in, for example, the reimageable surface of an imaging member during printing operations where surface contamination may result in print defects or system or operation failure. Adhesion sites, or sites of high surface energy, may be formed on a filler particle surface that causes such interactions. The impact of these interactions may be minimized or reduced by functionalizing the particles with passivating molecules. Further, functionalized particles may allow for fine dispersion of the filler particles in a polymer matrix, which enhance physical interactions such as optical absorption. Fine dispersion also enables improved compatibility in a polymer matrix which enhances mechanical properties.

Filler particles in accordance with embodiments may include carbon black particles that are surface passivated by way of poly (pentafluorostyrene/Maleimide-b-pentafluorostyrene) or P(PFS/MI-b-PFS) block copolymer being adsorbed onto the surface of the carbon black particles. Carbon black is known, and is known to be useful as a filler material in many uses including in imaging member surfaces. Carbon black is generally produced by the incomplete combustion of hydrocarbons, or by charring of other organic materials. Carbon black is commercially available from one of several different sources.

According to the disclosed schemes, the preparation of an NB-b-block copolymer is made by a living radical polymerization. Styrenics have a tendency to complex with maleic or maleimide molecules and the polymerization yields a perfectly alternating styrenic/maleic type copolymer. In the living radical polymerization system, the styrenic/maleic monomers are consumed first. Subsequently, in the presence of excess styrenic monomer, the polymer continues to grow resulting in a P(PFS/MI-b-PFS) block copolymer. This P(PFS/MI-b-PFS) block copolymer is then incorporated in a dispersion system and the maleimide moiety adsorbs onto the carbon black particles while the PFS tail gives dispersability in the fluorinated system. Carbon black particles that are passivated by P(PFS/MI-b-PFS) polymers when adsorbed onto the surface result in a robust treatment that renders the carbon black particles. The composition of the surface functionalized carbon black particles is new.

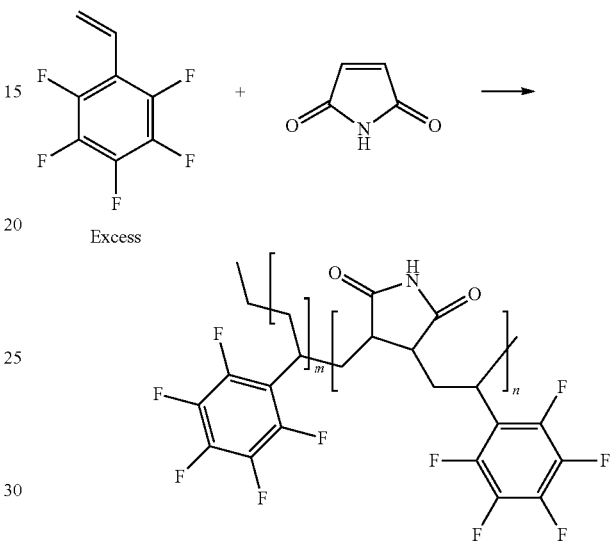

Functionalized carbon black particles in accordance with embodiments are suitable for fine dispersion in solvent for subsequent processing. Further, the carbon black particle composition in accordance with embodiments is suitable for dispersion in fluorinated polymers, and enables enhanced properties of carbon black and polymeric composites by enabling small particle size and fine dispersion.

P(PFS/MI-b-PFS) functionalized particles are suitable for incorporation into fluorinated polymeric media. Particles could be readily incorporated into polymers such as fluorosilicones, polyvinylfluoride, polytetrafluoroethylene, perfluoroalkoxyfluoropolymer (PFA-teflon), FKM polymer (such as VITON), fluorinated ethylene-propylene (FEP), or other fluoropolymers. The robustness of the surface treatment is advantageous for high temperature processing techniques such as melt mixing. Incorporation of these particles into various media may be advantageous in printing and document processing applications including fusing, solid ink printing, and ink-based digital printing, for example.

For example, filler compositions and particles of embodiments may be used to form a reimageable surface for an imaging member for an ink-based digital printing system. An imaging member for offset printing may include fluorosilicone comprising siloxane units. At least about 75% of the siloxane units may be fluorinated. The imaging member may include a surface layer having a fluorosilicone and an infrared-absorbing filler composition rendered in accordance with embodiments. The fluorosilicone may include amino-functional groups, and the filler may be present in an amount of from 5 to 40 weight percent, or from 10 to 30 weight percent, or from 15 to 25 weight percent. The filler may be functionalized carbon black in accordance with filler compositions of embodiments.

Methods of manufacturing an imaging member surface layer may include depositing a surface layer composition upon a mold, and curing the surface layer at an elevated temperature. The curing may be conducted at a temperature of from about 135° C. to about 165° C. Optionally, the surface layer composition may comprise a catalyst such as platinum. The cured surface layer may have a thickness of from 1 micron to 4 millimeters, or from 5 microns to 1 millimeter, or from 10 microns to 50 microns.

The cured surface layer may be confined to a thickness of less than 50 microns, or less than 20 microns, or in an optimal configuration, less than 10 microns, for the purpose that the near infrared radiation will be confined to the narrow topcoat layer for maximum thermal absorption and temperature increase. A sharp increase in temperature is necessary for the evaporation of dampening fluid during imaging.

A dampening fluid useful with an imaging member surface having the disclosed filler may include a fluid comprising a siloxane compound. The siloxane compound may be octamethylcyclotetrasiloxane (D4).

The imaging surface layer may display a surface roughness with an Ra in a range of from 0.2 microns to 2 microns, or from 0.3 microns to 1 micron, or from 0.5 microns to 0.8 microns. The surface roughness may be spontaneously formed upon curing, or formed via a subtractive process from the surface, such as chemical etching, plasma etching, or surface roughening.

Aspects of the present disclosure may be further understood by referring to the following example. Filler compositions comprising functionalized carbon black were produced that comprised hydrophobic carbon black particles passivated with P(PFS/MI-b-PFS). The carbon black particles had a diameter in a range of 50 nanometers to 1 micron, and enabled dispersion in fluorinated polymers, and fine dispersion in solvent. The example is illustrative only.

Example

P(PFS/MI-b-PFS) was prepared. Pentafluorostyrene (24.2 g), maleimide (1.33 g) and 2,2,6,6-tetramethyl-piperidine-1-oxyl (TEMPO, 0.119 g, 0.00075 mol) were added to a round bottom flask equipped with a reflux condenser, nitrogen inlet. This was then degassed with nitrogen gas for 10 minutes and then VAZO 67 (0.095 g, 0.0005 mol) was added. The solution was then heated, while under nitrogen gas, to a bath temperature of 138° C. After the bath temperature was attained, VAZO 88 (0.015 g) was added added at 30, 60, 120, 180 and 260 minutes. The solution was heated for 7 hours and then cooled. After cooling, tetrahydrofuran (THF) was added (10 mL) and then this solution was added to methanol (200 mL) to afford a poly (pentafluorostyrene/maleimide)-b-pentafluorostyrene-TEMPO terminated P(PFS/MI-b-PFS) polymer (8.5 g).

FIG. 1 illustrates a graph 100 showing an incremental increase of mass average molecular mass (Mw) for the polymer thereby graphically illustrating the living nature of the polymer.

A passivated carbon black dispersion was prepared. 325 g stainless steel shot was added to an attritor. Then, this P(PFS/MI-b-PFS) (6 g) was added to this and stirred at ~300 rpm. Subsequently, trifluorotoluene (TFT, 44 g) was added and stirred for 10 minutes. Carbon black (Mogul E, 12 g) was added to the stirred mixture, and the attritor was then stirred for 20 hours. The mixture was then sieved to give 43.8 g of carbon black functionalized dispersion with PPFS. Solids analysis showed a carbon black content of 13.3%. The particle size was 245 nm.

Figure 2:
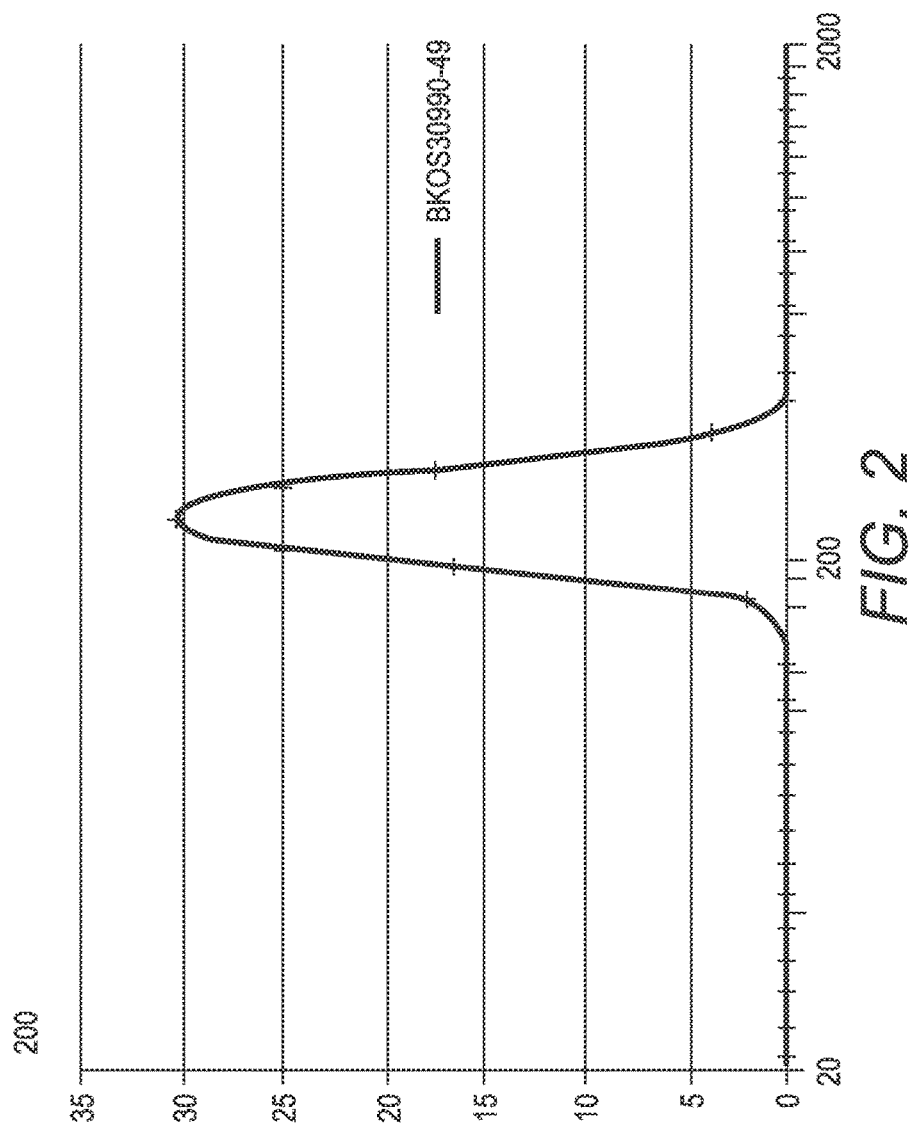
FIG. 2 illustrates a graph showing particle size dispersion, by volume, of functionalized carbon black particles according to this disclosure.

FIG. 2 shows a particle size distribution of the resultant passivated carbon black particles formed in accordance with disclosed embodiments. The graph shows a particle size distribution with a peak at 245 nanometers.

The present disclosure has been described with reference to exemplary embodiments. Modifications and alterations will occur to others upon reading and understanding the preceding detailed description. It is intended that the present disclosure be construed as including all such modifications and alterations insofar as they come within the scope of the appended claims or the equivalents thereof.

What is claimed is:

1. A particulate filler composition useful for print systems applications, comprising functionalized infrared absorbing particulates, the infrared absorbing particulates being functionalized by adsorbing a polymer onto the surface of the infrared absorbing particulates to surface passivate infrared absorbing particulates, wherein the polymer is an A/B-b-block copolymer comprising poly-(pentafluorostyrene/Maleimide-b-pentafluorostyrene) (P(PFS/MI-b-PFS)).

2. The particulate filler composition of claim 1, the infrared absorbing particulates comprising carbon black particles.

3. The particulate filler composition of claim 1, the polymer being prepared by a living radical polymerization.

4. The particulate filler composition of claim 1, the A/B portion causing the polymer to adsorb onto the carbon black.

5. The particulate filler composition of claim 4, the b-block acting as a stabilizer in a fluorinated system.

6. The particulate filler composition of claim 5, wherein the maleimide moiety adsorbs onto the carbon black and the pentafluorostyrene (PFS) tail gives dispersability in the fluorinated system.

7. The particulate filler composition of claim 1, a process temperature being maintain in a range of 120° C. or less.

8. The particulate filler composition of claim 1, the infrared absorbing particulates having a diameter of less than 1 µm.

9. The particulate filler composition of claim 1, the infrared absorbing particulates having a diameter in a range of 1 nm to less than 500 nm.

10. The particulate filler composition of claim 1, the infrared absorbing particulates having a diameter of from about 200 nm to about 300 nm.

11. The particulate filler composition of claim 1, the infrared absorbing particulates being finely dispersed in a solvent.

12. The particulate filler composition of claim 1, the infrared absorbing particulates being configured for dispersion in fluorinated polymer.

13. The particulate filler composition of claim 12, the fluorinated polymer including fluorosilicones.

14. The particulate filler composition of claim 1, the infrared absorbing particulates being functionalized to be hydrophobic.

15. A method for producing a particulate filler composition, comprising:
providing a polymer that is an A/B-b-block copolymer comprising poly-(pentafluorostyrene/Maleimide-b-pentafluorostyrene) (P(PFS/MI-b-PFS)) in a vessel;
stirring an organic fluorocarbon into the vessel;
adding carbon black particles to the vessel;
stirring the vessel for a first extended time period; and
sieving a resulting mixture to provide a functionalized carbon black as a produced particulate filler composition.

16. The method of claim 15 further comprising pre-preparing the P(PFS/MI-b-PFS) by
   providing pentafluorostyrene in a flask;
   adding maleimide to the flask;
   adding a polymer-supported catalyst to the flask;
   degassing the flask;
   adding a first free radical source to the flask;
   heating the solution under nitrogen gas to a pre-determined bath temperature;
   maintaining the pre-determined bath temperature for a second extended time period;
   periodically adding a second free radical source;
   cooling the solution;
   adding a cyclic ether; and
   adding the solution to methanol to provide the P(PFS/MI-b-PFS).

17. The method of claim 15, the vessel being an attritor with a pulverizer material added.

* * * * *